(12) United States Patent
Haugen (10) Patent No.: US 8,998,345 B2
(45) Date of Patent: Apr. 7, 2015

(54) SOLUTION MINING METHOD WITH ELONGATE SUMP

(71) Applicant: 101061615 Saskatchewan Ltd., Beechy (CA)

(72) Inventor: Harvey Haugen, Beechy (CA)

(73) Assignee: 101061615 Saskatchewan Ltd., Beechy, Saskatchewan (CA)

( * ) Notice: Subject to any disclaimer, the term of this patent is extended or adjusted under 35 U.S.C. 154(b) by 0 days.

(21) Appl. No.: 13/970,119

(22) Filed: Aug. 19, 2013

(65) Prior Publication Data

US 2014/0354031 A1    Dec. 4, 2014

Related U.S. Application Data

(60) Provisional application No. 61/830,132, filed on Jun. 2, 2013.

(51) Int. Cl.
*E21B 43/28* (2006.01)
*E21B 7/00* (2006.01)

(52) U.S. Cl.
CPC .. *E21B 7/00* (2013.01); *E21B 43/28* (2013.01)

(58) Field of Classification Search
USPC .............. 299/3–6, 16, 17; 166/259, 261, 266, 166/269, 271, 303, 306, 50
See application file for complete search history.

(56) References Cited

U.S. PATENT DOCUMENTS

| | | | |
|---|---|---|---|
| 2,161,800 A | 6/1939 | Cross | |
| 2,331,890 A | 10/1943 | Cross | |
| 3,612,608 A | 10/1971 | Manker et al. | |
| 4,232,904 A | 11/1980 | Hurd | |
| 4,264,104 A | 4/1981 | Helvenston et al. | |
| 4,815,790 A | 3/1989 | Rosar et al. | |
| 5,246,273 A | 9/1993 | Rosar | |
| 5,431,482 A | 7/1995 | Russo | |
| 7,611,208 B2 | 11/2009 | Day et al. | |
| 7,857,396 B2 | 12/2010 | Bishop | |
| 8,528,989 B2 * | 9/2013 | Halverson et al. | 299/4 |

FOREIGN PATENT DOCUMENTS

| | | |
|---|---|---|
| CA | 804945 | 1/1969 |
| CA | 832276 | 1/1970 |
| CA | 838477 | 4/1970 |
| CA | 942186 | 2/1974 |
| CA | 1113376 | 12/1981 |
| CA | 2666951 | 6/2010 |

OTHER PUBLICATIONS

Selim Ozsahin & W.H.W. Husband, An Investigation of the Potential Solution Mining of Potash in Saskatchewan, Aug. 1965, cover pg., pp. 37-39, Engineering Division.

* cited by examiner

*Primary Examiner* — Sunil Singh
(74) *Attorney, Agent, or Firm* — Antoinette M. Tease (57) ABSTRACT

An improved solution mining method for a soluble target layer comprising a target material such as potash, wherein an elongate sump is developed within a salt layer underlying the target layer, with generally horizontal wells extending through the target layer to empty into the elongate sump, the sump capable of storing at least a portion of the salt liberated from the target layer so that an optimized proportion of target material is produced.

16 Claims, 5 Drawing Sheets

SOLUTION MINING METHOD WITH ELONGATE SUMP

CROSS-REFERENCE TO RELATED APPLICATION

This application claims priority back to U.S. Patent Application No. 61/830,132 filed on Jun. 2, 2013.

FIELD OF THE INVENTION

The present invention relates to solution mining methods.

BACKGROUND OF THE INVENTION

In-situ leaching, also called in-situ recovery or solution mining, is traditionally a process of recovering minerals such as copper and uranium through boreholes drilled into the deposit. The process initially involves drilling of holes into the ore deposit, while explosive or hydraulic fracturing may be used to create open pathways in the deposit for solution to penetrate. Leaching solution is pumped into the deposit where it makes contact with the ore. The solution bearing the dissolved ore content is then pumped to the surface and processed. This process allows the extraction of metals and salts from an ore body without the need for conventional mining involving drill-and-blast, open-cut or underground mining.

Conventional solution mines create individual caverns, usually by dissolving salt from beneath the ore body, then rubblizing the ore into the cavern and dissolving the ore in fresh water or dilute brines to form near saturated solutions at temperatures equal to the ore temperature (or slightly higher). Caverns tend to develop vertically and, in some cases, consideration has been given to connecting caverns. In order to collect the ore from the solution, crystallization systems are necessary at the surface.

Conventional solution mining systems have difficulty raising the mine temperature above the formation temperature, as well as obtaining fully saturated brines. Thus at the surface they raise the potash concentration and temperature in evaporators. This is the most expensive part of the plant using large amounts of expensive and exotic metals. Large amounts of steam are also required in this process. The hot concentrated brines are then crystallized in evaporative crystallizers; these are limited to cooling to about 25 degrees C. One mine uses a system which takes the cooled brine to ponds, and makes use of natural cold crystallization in open ponds to add to plant recovery. This is still an expensive process requiring careful management and expensive dredging equipment. It also is seasonal with no potential to recover any heat.

Potash has been mined by solution mining techniques developed in the 1960s, as demonstrated at the Mosaic Belle Plaine Mine in Saskatchewan, Canada. The established method uses well pairs, from 50 to 80 meters apart.

In the predevelopment stage, water is pumped into the individual wells. Each well is equipped with a double casing. Water is pumped down the centre string, with brine returning up the annulus. When the caverns from each well connect due to dissolution of intervening materials, the water will then be pumped down one well and produced to surface through the second well to continue to wash out a salt cavern. This predevelopment cavern is commonly referred to as a sump and is located under the lowest potash bed. The water/brine is overlaid by oil or diesel fuel to prevent dissolving the overlying potash layer. The salt brine from this predevelopment stage is conventionally pumped to a deep well for disposal.

Primary mining commences after the sump is developed. Layers of the ore are broken into the sump (rubblized). In primary mining, preheated water is slowly pumped into the cavern to dissolve the potash and salt in the ore. When the brine comes to a desirable potash concentration (typically somewhere above 10% KCl, and about 18% NaCl), water flow to the cavern is set (commonly at around 50 cubic meters per hour) to maintain this discharge concentration throughout the primary mining stage, until the whole ore layer is removed. The brine temperature coming from the well is close to the ore temperature since the low flow rate limits the amount of heat that can be added even if the feed water is very hot. The slow dissolution rate limits flow to and from the cavern. A large scale mine will require as many as 40 well pairs, 2 per cavern (80 wells), at a given time.

While the brine is technically close to saturation, the potash level is lower than equilibrium, while the salt concentration is typically higher than at equilibrium conditions. In fact, the ratio of KCl to NaCl in the brine must be in the ratio of the KCl to NaCl ratio in the ore body since primary mining is generally defined as full dissolution of the ore. The unfavorable brine concentration requires that brine from the wells must be fed to expensive evaporators, then to crystallizers to recover the potash. Over 1 tonne of salt is produced in evaporation for each tonne of potash, and this salt is produced and stored on surface in large salt piles, with no end use.

About 30% of the production from a conventional solution mining operation is from secondary mining. A hot, NaCl saturated brine replaces the water feed used in primary mining. When the brine comes to near saturation, the new mixed KCl/NaCl brine from the mine is cooled in contact crystallizers or cooling ponds to produce the previously dissolved potash. This is an even slower process than with primary mining, and is seasonal when cooling ponds are used (only in cold winter weather).

It has long been suspected that if brine could be produced in the mine close to an equilibrated concentration, at elevated temperature (above 50 degrees C. but preferably closer to 80 degrees C.), this brine could simply be cooled in a crystallizer to produce a crystal potash product. This would eliminate, or at least minimize, the need for an expensive evaporation stage. It was believed that if the cold brine from the crystallizer is reheated and used for mine feed, only the potash will dissolve, while all the salt will be retained in the cavern and there will be no salt waste stored on surface.

Though this idea was well established, every attempt to implement it resulted in very limited production lasting only days. The liberated salt quickly filled the lower portion of the cavern, and dissolution rates continued to decline. Most tests were run using saturated NaCl brine, since crystallizers were not included in the test facilities, and the NaCl saturated brines blinded off the deposit. Tests were also done on single wells with the feed brine going down the centre string, and potential production brine rising in the annulus. This limited circulation to the deposit, however, and made heating of the deposit very difficult since the hot feed was cooled by the returning production brine by heat exchange across the tubing wall.

There have been limited attempts to overcome the problems with the conventional solution mining method. One example is Canadian Patent No. 2,725,013, owned by the present assignee, which provides a novel solution mining method that has advantages over the conventional technique. It teaches a method for the use of curved flow patterns to allow extraction of the potash values while leaving the undesirable salt in the cavern. This, then, allows polythermic mining of potash using a simple plant with cooling crystallizers, centrifuge and dryer as primary equipment. Alternately, a cooling pond could be used alone or in combination with conventional crystallization equipment or wiped surface crystallizers.

What is needed is a simplified well layout that has advantages for large scale production, without evaporation equipment or salt tailings stockpiles at surface. An improved solution mining method is presented in the following.

SUMMARY OF THE INVENTION

According to a broad aspect of the present invention, then, there is provided a solution mining method for recovering a target material from an at-depth at least partially soluble target layer, the target layer comprising salt and the target material, the target layer overlying a salt layer, the method comprising the steps of:

a. drilling a first well downwardly to the salt layer and then generally horizontally for a distance through the salt layer at or below an interface between the target layer and the salt layer, thereby forming a horizontal leg terminating at an end position;

b. drilling a second well downwardly to the horizontal leg at or near the end position of the horizontal leg of the first well;

c. injecting a sump formation fluid comprising heated water through the horizontal leg, thereby dissolving a portion of the salt layer adjacent the horizontal leg and forming an elongate sump;

d. drilling at least one target layer well downwardly to the target layer and then generally horizontally through the target layer, terminating with a downward segment connecting with the elongate sump;

e. providing an injection fluid of suitable chemical composition;

f. heating the injection fluid to a desired temperature selected to bring the target layer temperature to a desired target layer temperature;

g. injecting the injection fluid through the at least one target layer well toward the elongate sump to bring the target layer temperature to the desired target layer temperature and at least partially dissolve the target layer;

h. allowing the target layer to at least partially dissolve to form a target layer brine comprising the target material, resulting in a target layer cavern;

i. allowing waste salt to remain undissolved in the target layer cavern during dissolution;

j. allowing at least a portion of the waste salt and insoluble materials from the target layer to accumulate in the elongate sump;

k. producing the target layer brine and at least a portion of the injection fluid through the elongate sump and the second well;

l. recovering the target material from the target layer brine at surface; and m. reheating and reinjecting at least a portion of the produced target layer brine and the produced injection fluid to further dissolve the target layer.

In some exemplary embodiments of the broad aspect, the target material is potash. The injection fluid preferably comprises spent crystallizer brine or produced and reheated target layer brine from which the target material has been recovered. The desired temperature and the desired target layer temperature are preferably in the range of 60 to 90 degrees C.

The horizontal leg is preferably angled downwardly toward the end position and drilled entirely within the salt layer and spaced from the target layer. Produced salt brine may be added to the heated water for elongate sump formation, and the injection and production functions of the first and second wells may be reversed at least once during elongate sump formation. The horizontal leg of the first well may be drilled in a straight or curved orientation, while the horizontal segment of the at least one target layer well may be drilled in a curved, helical or angled orientation. The method may further comprise the step after step c of producing sail brine from the elongate sump, wherein the salt brine is first displaced by injection of potash brine and the salt brine then produced. At least a portion of the produced salt brine may be deposited in deep wells. The at least one target layer well is preferably disposed generally at a right angle to the long axis of the elongate sump, and the method preferably comprises at least two target layer wells. Preferably, at least some of the waste salt accumulates in the at least one target layer well.

A detailed description of an exemplary embodiment of an improved solution mining method according to the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

An exemplary embodiment of an improved solution mining method according to the present invention will now be described with reference to the accompanying drawings.

DETAILED DESCRIPTION OF EXEMPLARY EMBODIMENT

In the exemplary method according to the present invention, an elongate sump is drilled out in the salt layer underlying the soluble target layer using horizontal drilling techniques, and subsequent generally horizontal holes are drilled through the overlying target layer, parallel to the base of the target layer and at an angle to the elongate sump, such that they empty into the elongate sump. The elongate sump is drilled in the same plane as the target layer and therefore may be slightly off-horizontal. The subsequent horizontal holes are preferably curved or sinusoidal in form, as illustrated in Canadian Patent No. 2,725,013, thereby laterally extending the dissolution action while allowing liberated salt to precipitate in the curves of the holes.

An initial well will be drilled from surface, then directed horizontally in the salt layer, under the lowest potash bed selected for production. This hole will be connected to a vertical hole at the other end (with perhaps a mile between verticals). Salt sumps will be developed under high flow conditions with added heat. A mixture of hot water and brine from the cavern will be circulated through the horizontal well bore to dissolve a horizontal salt cavern (sump). Flow will be reversed between the vertical well and the initial well from time to time to create a large diameter cylindrical cavern, the elongate sump. Fresh water will be added to the heated circulation and saturated NaCl brine removed and transferred to a waste brine injection well.

The horizontal section of this sump development may be drilled straight, or in a curved pattern, typically a short wavelength sinuous pattern. Though there will be no suspended solids to store, the curved pattern will encourage flow against the walls of the cavern and increase salt dissolution rate.

While the curvature of the various horizontal holes is illustrated as being entirely in a horizontal plane, it is possible, for example in thicker deposits, to have these holes drilled in helical or angled orientations to make a desired contact with the ore body.

The sump will preferably (but not necessarily) be developed entirely in the salt deposit and will preferably (but not necessarily) not encroach on the lowermost potash layer at any point. The sump will preferably be oriented up slope in a sloped potash deposit with the primary well located at the low point, close to the processing plant. Salt brine is lower in density than the production (potash-enriched) brine; this allows the removal of the brine in the salt cavern (sump) by displacing the NaCl brine with hot saturated KCl brine. KCl brine is carefully added to the low end of the salt cavern, expelling the NaCl brine from the well at the higher elevation. This can be done with produced brines from the mining operation or by running a single well at the low point in production mode until the NaCl brine is displaced.

Drilling the sump entirely in the salt layer eliminates the use of an oil layer, and allows development of the sump system in sloped formations. Other mining plans using oil layers have difficulty in sloped formations. If an oil blanket is used with the present invention, care will need to be taken to drill this well in a direction across the slope of the potash deposit, so both ends are at the same elevation and the oil distributes across the length of the cavern. The use of an oil blanket also requires care in limiting flow rates through the cavern that could disrupt the oil layer.

On completion of the salt sump, a number of generally horizontal wells are then drilled into the potash bed, as discussed above, preferably at approximately right angles to the salt sump. These wells are drilled to follow the bottom of the potash bed (preferably about a foot above the salt/potash interface). In the preferred embodiment of the invention, these holes will be drilled over a distance of about a mile and will include a sinusoidal curvature. In the preferred case, a half wavelength would be used for each well (over about 1 mile) with the reverse curve added on the next well in the sequence (as discussed below). Full wavelengths could also be used (or multiples). If full wavelengths are used, dissolution rates are higher at the point of injection and drop off downstream. To balance the development, the first wells might alternate, with every second well ½ the length of the others to stagger the high development area near the point of injection. As the mine develops, all additional wells will add to the first wells and will be full length.

The production wells will operate at high flow rates as disclosed in Canadian Patent No. 2,725,013. Heat will be added and circulation increased, preferably by reheating a portion of the produced target layer brine for use in recirculated injection fluid, the amount depending on the ore temperature selected, the mining rate required and the stage of well development. The higher temperature in the caverns allows the use of conventional crystallizer systems, alone or in combination with cooling/crystallization ponds or wiped surface crystallizers. Crystallizer mother liquor is added to the heated, circulating brine flow into the potash horizontal wells, and out of the salt cavern wells (now the production wells for the life of the particular dissolution string).

The extended salt sump provides a conduit for transportation of the hot production brine to the plant and significantly reduces the cost of pipelines for the produced brine. Production brine lines are subject to crystal buildup when transporting saturated brines, unless provided with extra heating.

The salt sump allows for storage of some of the salt liberated from the potash ore, as potash dissolves from the first horizontal holes. This is particularly important in lower grade ores. As the curved holes develop, however, most of the salt will be stored in the space created in the curvature and along the floor of the potash cavern as foe potash dissolves (see Canadian Patent No. 2,725,013). This is even more the case as second and third ranks are added to the first horizontal holes, as described below.

FIGS. 1 through 5 and the accompanying description describe the use of two rows of wells that could easily be extended to 10 to 15 wells in each row. For a larger plant, or as production advances, the two row design would be extended to take up the entire length of the salt sump. A new salt sump would then be developed preferentially on the higher elevation end of the first sump. The sump extension would be developed separate from the first but using the same techniques. When complete, the salt brine would be displaced from the new sump and a connection would be made to the first sump. New production wells will be added into this sump, as for the first. Produced brine from the target layer will flow into this sump, then through the interconnection to the first sump, allowing all produced brines to be transported to the plant underground via this sump network.

The above process is repeated as required until the whole deposit is recovered over the life of the mine.

The description relates to mining of a single potash member. The vertical portion of a production well could be "kicked off" with a horizontal portion drilled into a second or third ore layer and mined by the same techniques. Depending on separation distances, the horizontal portion of the first production well could be turned down into the lower "mined out" layer or to a previously drilled horizontal sump drilled in either potash or salt. This new sump would be at roughly right angles to the producing wells as in the original design but would be drilled to interconnect with the original sump.

The improved mining method provides an improved mine layout, especially for large scale mines. While the method is expected to allow increases in extraction rate, this arrangement also allows limitation of the cavern extent to match any (including current) ground mechanics criteria. The extent of horizontal development can be controlled by circulation rate through caverns, cavern spacing, and the design (sinuosity) of the caverns. The existing mines are limited to extraction of about 40% of the area of the ore deposit based on rock mechanics criteria. This method is expected to allow substantially all the ore to be extracted from the target layer(s) over time consistent with good rock mechanics design. The mine design removes only the potash from the high grade layers (about 2 to 3 meters each), while the conventional mines remove a large salt sump, and most of the salt along with the potash in the potash zones, leaving as much as 8 to 10 meters of open space. The mining sequence can be scheduled to remove the ore in segments as the plastic potash beds are allowed to close in over the mined segments.

Figure 1:
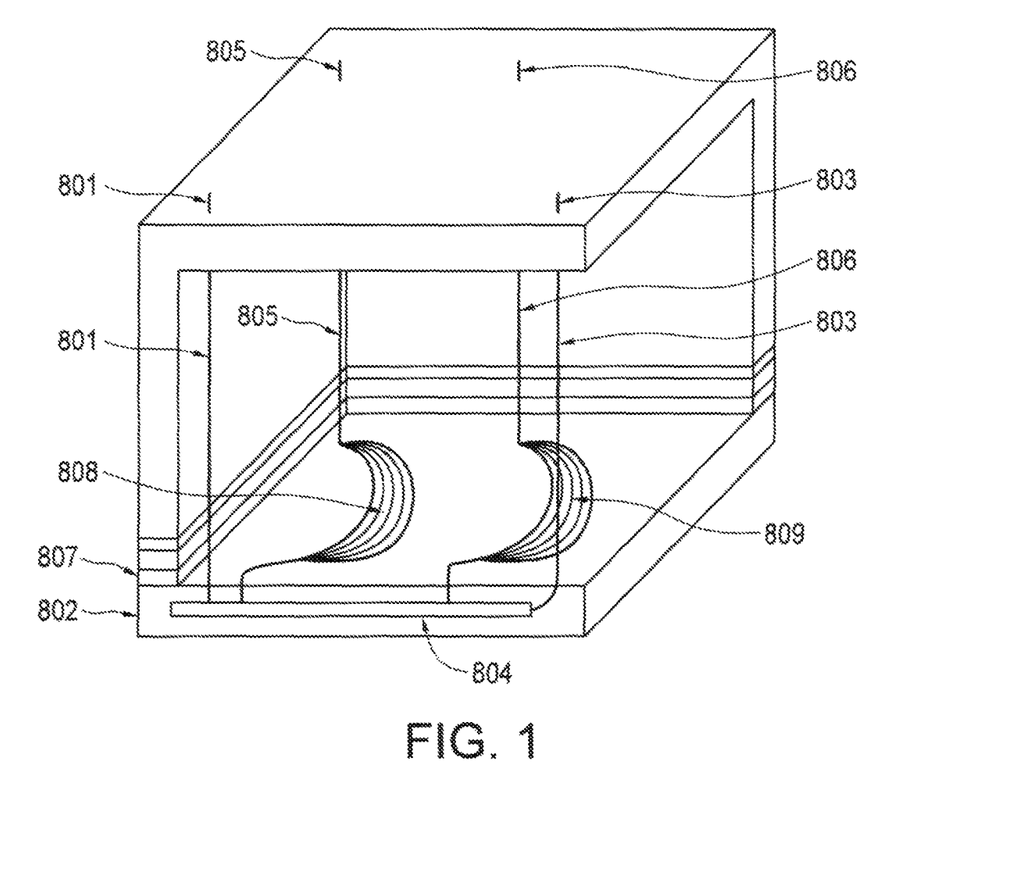
FIG. 1 is a simplified schematic view of an improved solution mining plan showing the well and sump arrangement and the use of two curved horizontal wells through the potash deposit.

Turning now to FIG. 1, an initial hole 803 is drilled down to and into the underlying salt bed 802, then roughly horizontally for a distance of about a mile, parallel to the potash deposit, but well underneath that deposit. Note that the illustrated potash/salt interface may be slightly angled, so the horizontal leg would also be slightly angled. A vertical well 801 is drilled to intersect the end of the horizontal leg of the well 803. Hot water is circulated to the first well 803, then through the salt cavern using a pump and heating device to dissolve a cylindrical salt cavern 804 with salt brine exiting well 801. Flow is reversed from time to time as desired, with injection through well 801 and production through well 803.

Horizontal wells 805 and 806 are drilled down to the potash level 807 using a vertical leg, then drilled horizontally through the potash layer 807, then down into the salt cavern 804.

Salt brine is displaced from the salt cavern 804 by initiating production on well 805, which connects at the lowest point of the salt sump. Hot water is then injected through well 805 at controlled rates, through the target layer, with production through well 801. The water dissolves potash from the horizontal well bore segment of well 805 in the potash bed 807. The potash brine flows back into the salt sump 804, then returns to surface on the (now) production discharge well 801. The discharge of well 801 is reheated, then mixed with hot water and returned to well 805. More potash is dissolved. A quantity of brine equal to the amount of water added (plus the dissolved crystal) will be left in the salt sump. That amount of salt brine is then metered off the salt sump well 803. This preproduction sequence is continued until all the salt brine is displaced or until the salt is known to be beyond the intersection of production well 806, at which time well 806 can be brought on in parallel with well 805 and the process continued.

When all the salt brine is substantially displaced from the salt sump, actual potash production will commence (the displacement process may take only a few hours). The brine from well 801 is now near saturated in KCl and at a selected temperature that may be in the range of 60 to 90 degrees C., preferably about 90 degrees C. A mix of reheated brine from the cavern production well 801 and fresh crystallizer mother liquor is circulated back to potash wells 805 and 806 to remove potash and form caverns 808 and 809. The amount of brine recirculated from well 801 is determined by the need to control flow rates in the caverns and the temperature from well 801. The remainder flows to the crystallizers.

Figure 2:
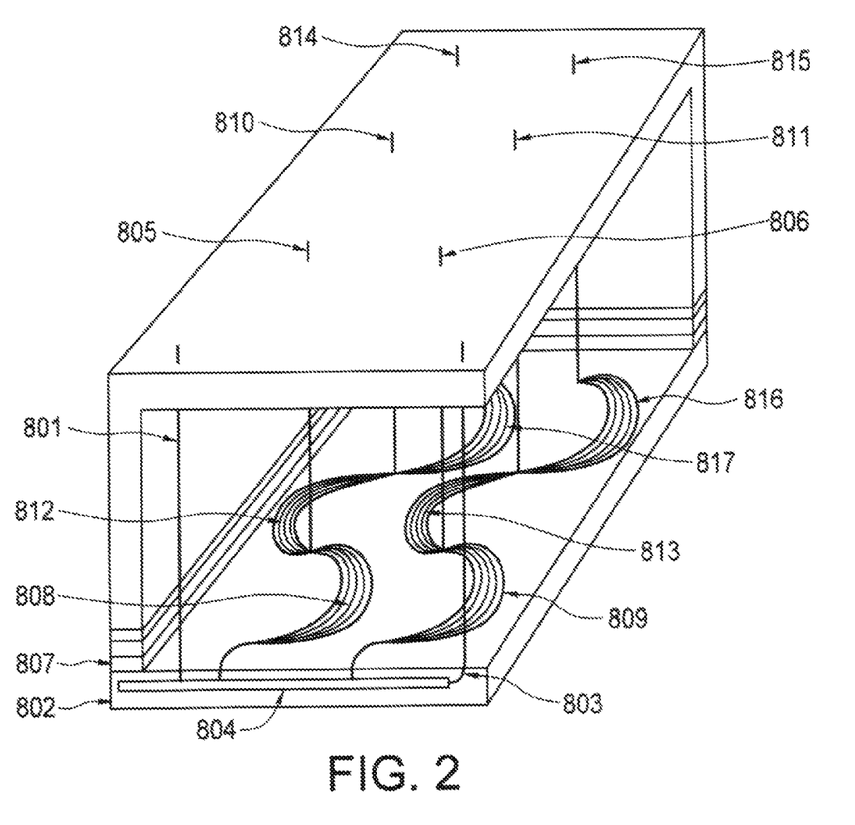
FIG. 2 is a simplified schematic view of the improved solution mining plan showing the addition of two new vertical wells and the creation of two new caverns.

Turning then to FIG. 2, later two additional holes 810 and 811 are drilled in the potash zone 807. Part of the heated mother liquor plus a portion of the reheated production brine from well 801 is pumped down these new wells 810 and 811 forming new caverns 812 and 813, while the remainder is simultaneously being pumped down the first production wells 805 and 806.

Additional well pairs 814 and 815 will be added in a similar manner to form cavern 816 and 817.

Figure 3A:
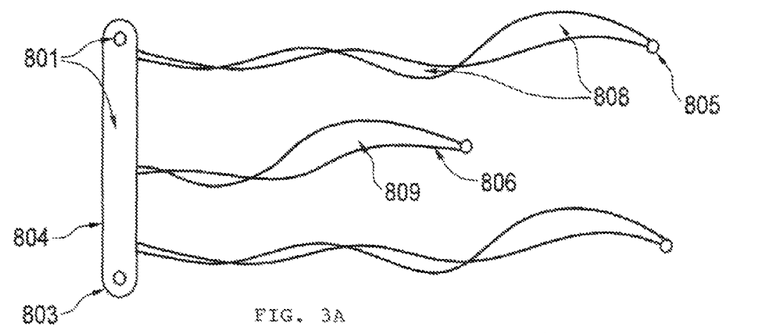
FIG. 3A is a simplified plan view showing sinusoidal cavern development.
Figure 3B:
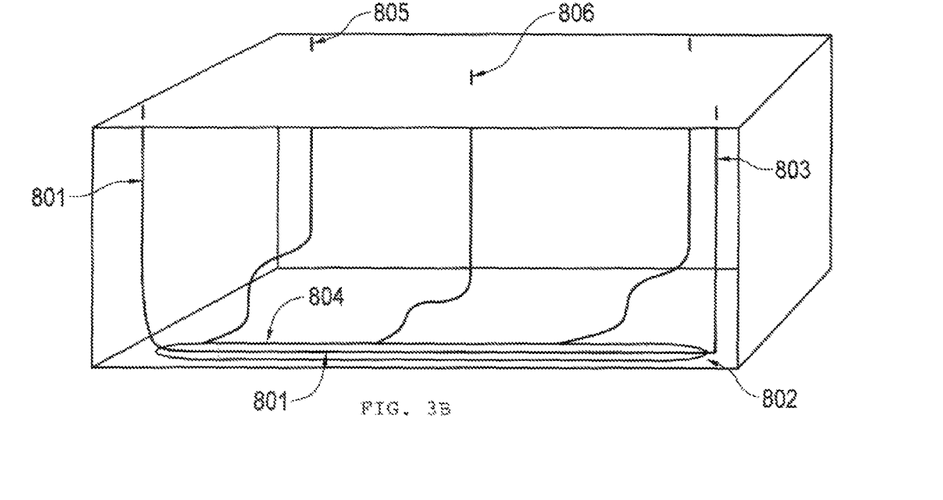
FIG. 3B is a simplified perspective view showing sinusoidal cavern development.

FIG. 3 shows the system using two wavelengths of roughly sinusoidal curves, instead of the half waves in FIGS. 1 and 2.

Figure 4:
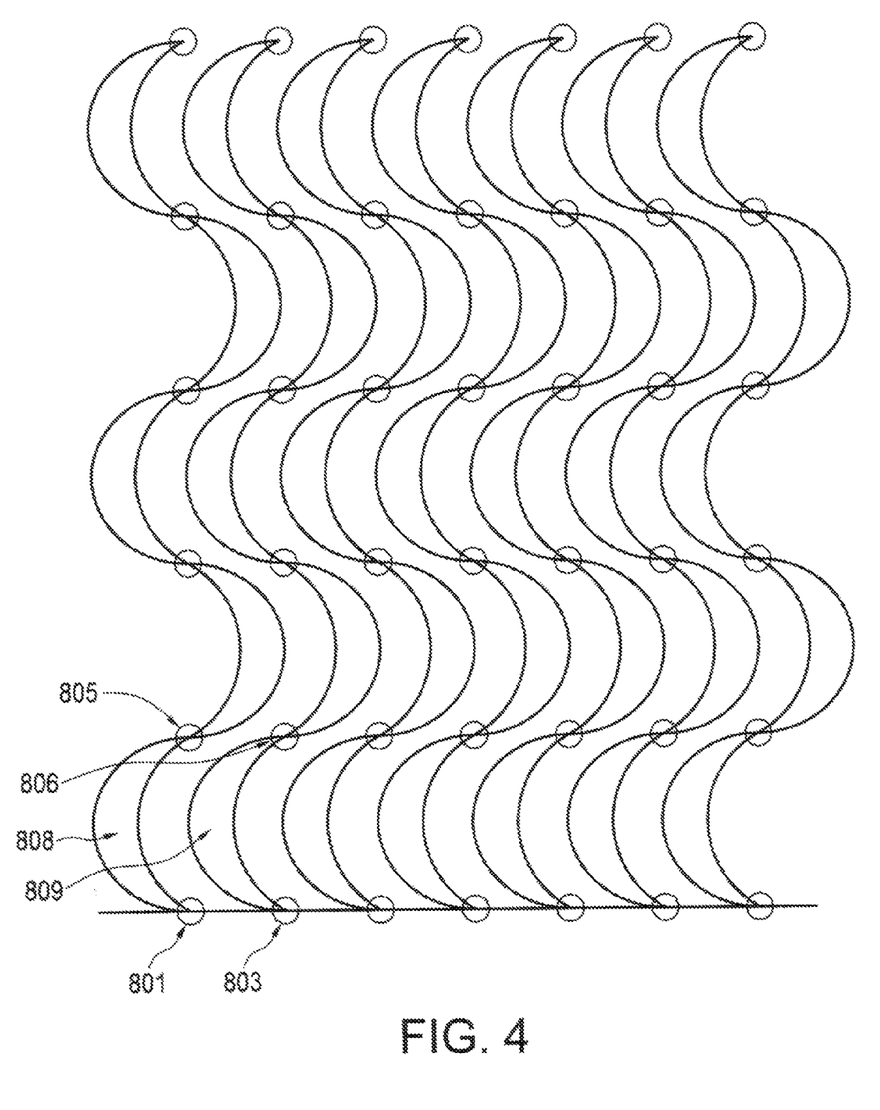
FIG. 4 is a top plan view illustrating the expansion of the mine plan over time.

FIG. 4 shows the expansion of the mine plan using half wavelength holes. Note that the pattern shown is for an ideal situation, but can be readily modified to work around collapse structures, freehold properties or the edge of the lease. The vertical scale is about a mile per well (each crescent). The wells are about ½ mile apart on the horizontal scale. This plan represents about 20 square miles. Based on 4 to 5 million tonnes per square mile, it would represent 80 to 100 million product tonnes.

Figure 5A:
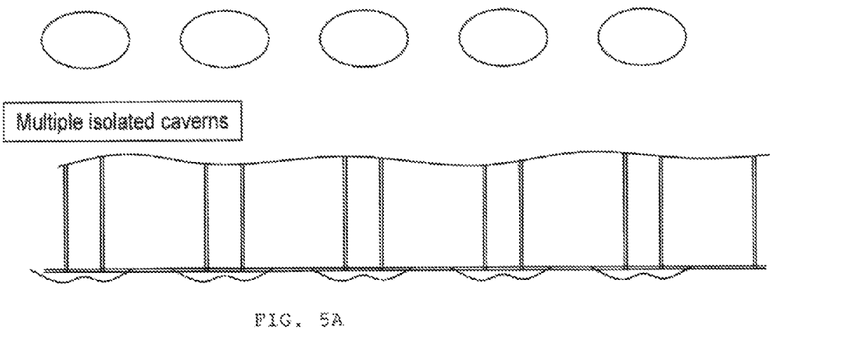
FIG. 5A is a simplified elevation view of a conventional sump pattern.
Figure 5B:
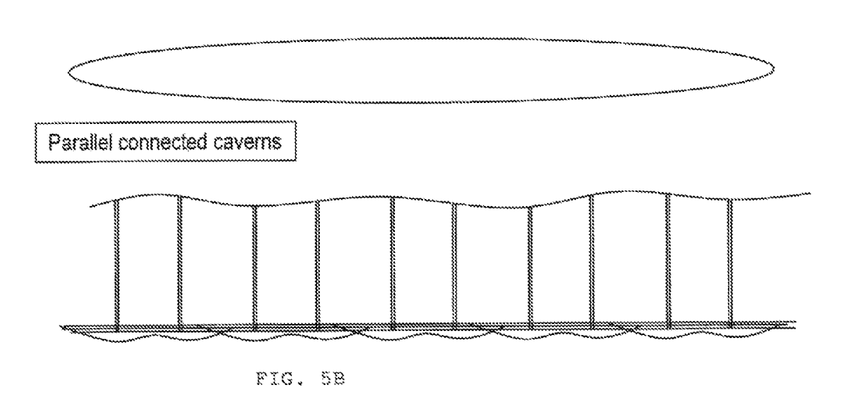
FIG. 5B is a simplified elevation view of an improved sump pattern according to the present invention.

FIG. 5 illustrates the interconnected sumps forming a single elongate sump, as opposed to the isolated sumps of conventional processes.

The foregoing is considered as illustrative only of the principles of the invention. The scope of the claims should not be limited by the exemplary embodiment set forth in the foregoing, but should be given the broadest interpretation consistent with the specification as a whole.

The invention claimed is:

1. A solution mining method for recovering a target material from an at-depth at least partially soluble target layer, the target layer comprising salt and the target material, the target layer overlying a salt layer, the method comprising the steps of:
   a. drilling a first well downwardly to the salt layer and then generally horizontally for a distance through the salt layer at or below an interface between the target layer and the salt layer, thereby forming a horizontal leg terminating at an end position, wherein the horizontal leg is drilled in a curved orientation;
   b. drilling a second well downwardly to the horizontal leg at or near the end position of the horizontal leg of the first well;
   c. injecting a sump formation fluid comprising heated water through the horizontal leg, thereby dissolving a portion of the salt layer adjacent the horizontal leg and forming an elongate sump;
   d. drilling at least one target layer well downwardly to the target layer and then generally horizontally through the target layer, connecting with the elongate sump;
   e. providing an injection fluid of suitable chemical composition;
   f. heating the injection fluid to a desired temperature selected to bring the target layer temperature to a desired target layer temperature;
   g. injecting the injection fluid through the at least one target layer well toward the elongate sump to bring the target layer temperature to the desired target layer temperature and at least partially dissolve the target layer,
   h. allowing the target layer to at least partially dissolve to form a target layer brine comprising the target material;
   i. allowing liberated waste salt to separate out of the target layer during dissolution;
   j. allowing at least a portion of the waste salt and insoluble materials from the target layer to accumulate in the elongate sump;
   k. producing the target layer brine and at least a portion of the injection fluid through the second well;
   l. recovering the target material from the target layer brine at surface; and
   m. reheating and reinjecting at least a certain amount of the produced target layer brine and the produced injection fluid to further dissolve the target layer, wherein the amount of the reheated and reinjected target layer brine is determined by a need to control flow rates in the target layer and the temperature from the second well.

2. The method of claim 1 wherein the target material is potash.

3. The method of claim 1 wherein the injection fluid comprises spent crystallizer brine.

4. The method of claim 1 wherein at least a portion of the injection fluid comprises the produced and reheated target layer brine from which the target material has been recovered.

5. The method of claim 1 wherein the desired temperature and the desired target layer temperature are in the range of 60 to 90 degrees C.

6. The method of claim 1 wherein the horizontal leg is angled downwardly toward the end position.

7. The method of claim 1 wherein the horizontal leg is drilled entirely within the salt layer and spaced from the target layer.

8. The method of claim 1 wherein produced salt brine is added to the heated water for elongate sump formation.

9. The method of claim 1 wherein injection and production functions of the first and second wells are reversed at least once during elongate sump formation.

10. The method of claim 1 wherein a horizontal segment of the at least one target layer well is drilled in a straight, curved, helical or angled orientation.

11. The method of claim 1 comprising the further step after step c of producing salt brine from the elongate sump.

12. The method of claim 11 wherein the salt brine is first displaced by injection of potash brine, the salt brine then produced.

13. The method of claim 1 wherein the at least one target layer well is disposed generally at a right angle to the long axis of the elongate sump.

14. The method of claim 1 wherein at least some of the waste salt accumulates in the at least one target layer well.

15. The method of claim 1 comprising at least two target layer wells.

16. The method of claim 1, wherein the elongate sump provides a conduit for transportation of the target layer brine to a processing plant, and wherein interconnected sumps for a single elongate sump.

* * * * *